Patented Jan. 30, 1951

2,539,384

UNITED STATES PATENT OFFICE 2,539,384

COMPOSITION FOR PREVENTING FOGGING OR FREEZING ON AUTOMOBILE WINDSHIELDS

Robert A. Macklin, Toronto, Ontario, Canada
No Drawing. Application July 23, 1948,
Serial No. 40,425

2 Claims. (Cl. 106—13)

The object of the present invention is to devise a composition which may be applied as a coating to windshields of motor vehicles or other transparent surfaces to prevent the deposition of moisture thereon in the form of a mist or vapor with the danger, in cold weather of the mist or vapor freezing and preventing proper vision through the windshield.

This object is attained by forming a composition comprising the following ingredients:

| | Pounds |
|---|---|
| 2 methyl 2, 4 pentanediol | 86–90 |
| Sodium Stearate | 2¼–3 |
| Water | 6–10 |

2 methyl 2, 4 pentanediol is a product made by Shell Oil Co. of Canada, Limited, and sold under the designation "hexylene glycol."

It is found, however, that best results are obtained if the said ingredients are employed in the following proportions by weight:

| | Pounds |
|---|---|
| 2 methyl 2, 4 pentanediol | 88½ |
| Sodium Stearate | 2⅝ |
| Water | 8⅞ |

The various ingredients are thoroughly mixed together and then subjected to boiling at a temperature of approximately 200° Fahr. The mixture is then allowed to cool to about 130° Fahr., and is then poured into jars or suitable containers and allowed to gel.

I prefer, however, to add to the mixture before pouring it into the containers iso-bornyl-acetate of 15% concentration. This is for the purpose of giving the composition a distinctive color and further acts as a perfuming agent for the composition to hide any undesirable odour of the other ingredients.

What is claimed is:
1. A composition for preventing fogging or freezing on glass and similar surfaces comprising 2-methyl-2, 4 pentanediol, sodium stearate and water in the proportions of 86 to 90 lbs. of the first, 2¼ to 3 lbs. of the second and 6 to 10 lbs. of water.

2. A composition for preventing fogging or freezing on glass and similar surfaces comprising 2-methyl-2, 4 pentanediol, sodium stearate and water in the proportions of 88½ lbs. of the first, 2⅝ lbs. of the second and 8⅞ lbs. of water.

ROBERT A. MACKLIN.

REFERENCES CITED

The following references are of record in the file of this patent:

UNITED STATES PATENTS

| Number | Name | Date |
|---|---|---|
| 1,213,368 | Hibbert | Jan. 23, 1917 |
| 1,394,774 | Kuhn | Oct. 25, 1921 |
| 1,556,714 | Ridgely | Oct. 13, 1925 |
| 2,292,097 | Vollmer | Aug. 4, 1942 |
| 2,333,794 | Jones | Nov. 9, 1943 |
| 2,469,309 | Morris et al. | May, 3, 1949 |

OTHER REFERENCES

Condensed Chem. Dictionary, Gregory, 3rd. ed., 1942, p. 131.

Hackh. Chem. Dictionary, 2nd. ed., 1937, pp. 454 and 726.

Lange, Handbook of Chem., Handbook Publishing Company, 1941, p. 396 (Handbook Publishers Company, Sandusky, Ohio).